June 7, 1960 W. R. HICKLER ET AL 2,939,180
SLUSH-MOLDING METHOD FOR MAKING FOOTWEAR WITH THICKENED
PORTIONS FROM LIQUID HEAT-FUSIBLE MATERIAL
Filed May 23, 1955 2 Sheets-Sheet 1

INVENTORS
WALTER R. HICKLER
JAMES L. POWELL
BY James R. Lindsay
ATTY.

June 7, 1960  W. R. HICKLER ET AL  2,939,180
SLUSH-MOLDING METHOD FOR MAKING FOOTWEAR WITH THICKENED
PORTIONS FROM LIQUID HEAT-FUSIBLE MATERIAL
Filed May 23, 1955  2 Sheets-Sheet 2

INVENTORS
WALTER R. HICKLER
JAMES L. POWELL
BY James R. Lindsay
ATTY

United States Patent Office 2,939,180
Patented June 7, 1960

2,939,180

SLUSH-MOLDING METHOD FOR MAKING FOOTWEAR WITH THICKENED PORTIONS FROM LIQUID HEAT-FUSIBLE MATERIAL

Walter R. Hickler, Sudbury, and James L. Powell, Lexington, Mass., assignors to The B. F. Goodrich Company, New York, N.Y., a corporation of New York Filed May 23, 1955, Ser. No. 510,450

4 Claims. (Cl. 18—58)

This invention relates to a method for making footwear and pertains more particularly to a method for making footwear from a liquid heat-fusible composition.

The manufacture of footwear from a liquid heat-fusible composition either by a slush-molding process or by a dip-molding process to form an article having elastic character has advantages over the making of a similar article of footwear by assembling separate elements of the article on a last. However, when either a slush-molding process or a dip-molding process is employed in making such footwear, difficulty has been experienced in forming a sufficient thickness of heat-fused composition at the sole and heel regions of the footwear. Porter, United States Patent 2,588,571, describes a slush-molding process for making such footwear and discloses forming an extra thickness of material at the sole and heel regions of the boot or shoe by heating the sole and heel areas of the mold for a longer period of time in contact with heat-fusible composition than those areas of the mold used in forming the thinner wall portions of the boot or shoe.

The present invention provides a slush-molding process for making footwear from a liquid heat-fusible composition in which a hollow open-end mold having a cavity corresponding in shape to the contour of the outer surface of the boot or shoe to be formed is filled with a liquid heat-fusible composition which when fused forms a flexible material which is elastic, that is, a material that will return to essentially its prestretched shape after being stretched. A substantial quantity of the heat-fusible composition in the mold then is drained from the mold leaving in the mold only a sufficient quantity of the heat-fusible composition to coat the side walls of the mold with a layer of the composition and to form a pool of the heat-fusible composition in the bottom of the mold cavity corresponding in depth to the height on the boot or shoe being formed to which a wall of extra thickness is to extend. The mold is heated to gel the heat-fusible composition clinging to the side walls of the mold and to deposit onto the mold wall by gelation a layer of heat-fusible composition of desired thickness from the pool of heat-fusible composition at the bottom of the mold cavity.

The heat-fusible compositions which may be used in this invention are compositions which in the ungelled and uncured state have a heavy cream-like consistency but which in the fused or cured condition are flexible resilient materials, such as heat-gellable rubber latices and heat-fusible synthetic plastic compositions which are elastic when fused. A plastisol composition, which essentially is a composition comprising a polyvinyl chloride resin dispersed in a liquid plasticizer and one or more stabilizers for the polyvinyl chloride resin, is a preferred heat-fusible composition for use in this invention.

The invention is illustrated by the following description of a process for making a boot having an outer flexible resilient layer lined with a flexible resilient sponge layer.

Figure 1:
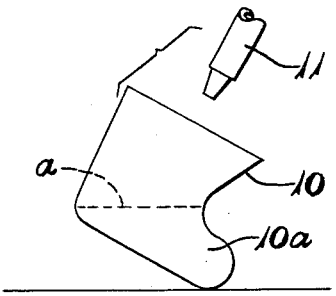
Fig. 1 shows schematically initially filling the mold in toe-depending position with a heat-fusible composition.

Referring to the drawings, mold 10 is a hollow open-end mold having a cavity corresponding in contour to the shape of the exterior surface of the boot to be formed in the mold. Preferably, the wall of mold 10 is of uniform thickness and is formed of metal by any of the known procedures. For example, mold 10 can be made by electrically-depositing a suitable metal, such as copper, onto a form having a shape corresponding to the configuration of the outer surface of the boot to be formed by the process of this invention until a sufficient thickness of the metal has been deposited on the form, the form then being removed from the metal deposit.

Figure 2:
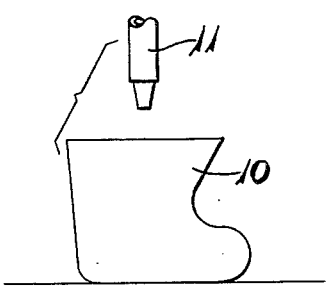
Fig. 2 shows schematically completing the filling of the mold in an upright position with a heat-fusible composition.

Mold 10 is filled with a liquid heat-fusible composition, for example a plastisol composition, until mold 10 is filled to a level at least equal to the height of the top edge of the boot to be formed. As shown in Fig. 1, mold 10 preferably is in a toe-depending position during the initial stage of filling to prevent entrapment of air in the toe section 10a of the mold. After toe section 10a has been filled with the heat-fusible composition, for example to level a as shown in Fig. 1, mold 10 is rotated to an upright position, as shown in Fig. 2, and the filling of mold 10 with heat-fusible composition is continued until mold 10 is filled to the proper level. Mold 10 may be filled with heat-fusible composition by any convenient method, such as through a nozzle 11 which is connected to a suitable storage container (not shown) for the heat-fusible composition. It is preferable that a deaerated liquid heat-fusible composition be used so that the molding composition does not contain air bubbles which tend to cause blemishes in the finished boot.

Figure 3:
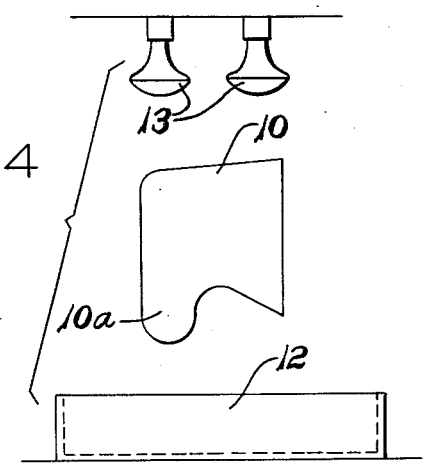
Fig. 3 shows schematically draining heat-fusible composition from the mold and heating the mold to lower the viscosity of the heat-fusible composition adjacent the wall of the mold to facilitate the drainage of heat-fusible composition from the mold.

After mold 10 is filled to a level at least equal to the height of the upper edge of the boot to be formed, the filled mold 10 is inverted and the heat-fusible composition in excess of that amount required to deposit a desired thickness of coating on the side walls of the mold and to fill the bottom of the mold cavity to a level which corresponds to the height to which it is desired to form an extra thick deposit of material is drained from the mold. For example, if it is desired that the boot have an extra thick wall extending across the bottom of the boot and upwardly at the side of the boot to a height of one inch from the bottom face of the boot, a pool of heat-fusible composition one inch deep is retained in the bottom of the mold cavity. A convenient way to drain the excess heat-fusible composition from mold 10 is to rotate the mold to a toe-depending position, such as shown in Fig. 3, so that toe section 10a of the mold remains filled with the heat-fusible composition. Upon reverting mold 10 to an upright position the heat-fusible composition entrapped in toe section 10a of the mold will distribute itself as a pool in the bottom of the mold cavity, the depth of the pool formed in the bottom of the mold cavity depending upon the position to which mold 10 is rotated when draining the mold. The heat-fusible composition drained from mold 10 may be collected in a suitable container 12 and re-used. If the viscosity of the heat-fusible composition is too high to allow proper draining of the composition from mold 10, the viscosity of the composition can be lowered by applying heat to the wall of mold 10 in any suitable manner, such as with infra-red lamps 13, 13 as shown in Fig. 3. However, the heat applied to the mold for reducing the viscosity of the heat-fusible composition should not be sufficient to cause gelation of the heat-fusible composition.

Figure 4:
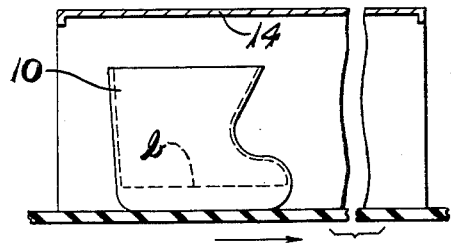
Fig. 4 shows schematically heating the mold to gel the heat-fusible composition clinging to and adjacent to the wall of the mold.
Figure 5:
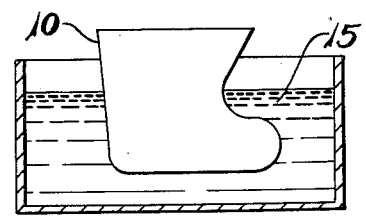
Fig. 5 shows schematically cooling the mold and gelled deposit by advancing the mold through a cooling medium.

When all of the unrequired heat-fusible composition has drained from mold 10, the mold is returned to an upright position. In the upright position the mold has a deposit of heat-fusible composition clinging to its side walls and a pool of desired depth of heat-fusible composition at the bottom of the mold cavity, as indicated by line b in Fig. 4. Mold 10 is heated, such as by advancing the mold through a suitable hot air oven 14 as shown in Fig. 4, to gel the heat-fusible composition clinging to the side walls of the mold and to gel the heat-fusible composition in the pool of heat-fusible composition at the bottom of the mold cavity immediately adjacent to the mold wall until a desired thickness of gelled composition has been deposited onto the mold wall from the pool of heat-fusible composition at the bottom of the mold cavity. Accordingly, an extra thick deposit can be formed along the sole of the boot and along the side of the boot extending upwardly from the sole a desired distance as compared to the remainder of the deposit. After the gelling operation, mold 10 is preferably cooled by advancing the mold through a cooling medium, such as the water bath 15 shown in Fig. 5, so that the mold can be handled without discomfort.

Figure 6:
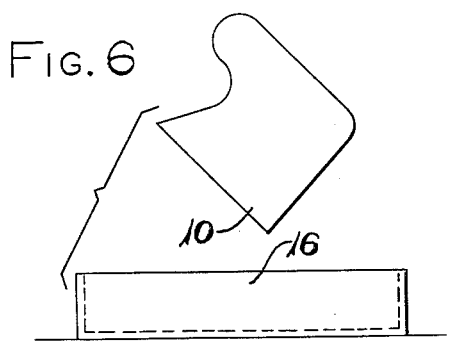
Fig. 6 shows schematically draining excess ungelled heat-fusible composition from the mold.

Mold 10 is inverted, as shown in Fig. 6, to drain from the mold the excess ungelled heat-fusible composition which remains in the bottom of the mold cavity after the gelling operation described heretofore. The ungelled material may be collected in a suitable container 16 and re-used.

Figure 7:
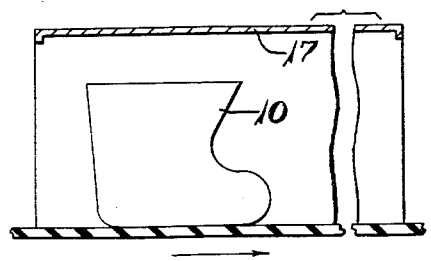
Fig. 7 shows schematically reheating the mold to gel any liquid heat-fusible composition remaining in the mold after drainage of the excess heat-fusible composition from the bottom of the mold cavity.

In draining the excess ungelled heat-fusible composition from the bottom of the mold cavity, a film of ungelled composition will remain on the surface of the previously gelled deposit. Consequently, mold 10 is reheated, such as by advancing the mold through a suitable hot air oven 17 as shown in Fig. 7, to gel this film of ungelled material.

Figure 8:
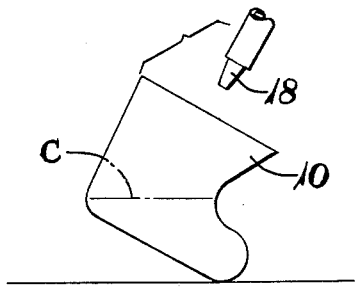
Fig. 8 shows schematically initially filling the mold in toe-depending position with a heat-fusible sponge-forming composition.
Figure 9:
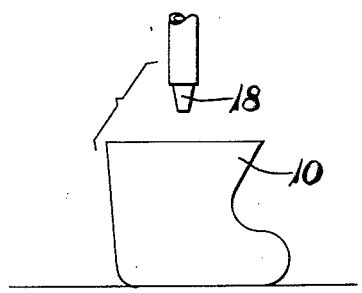
Fig. 9 shows schematically completing the filling of the mold in an upright position with a heat-fusible sponge-forming composition.

If it is desired to form a relatively thin-walled boot without a sponge lining the gelled composition deposited on the wall of mold 10 is fused at this stage of the process by heating the mold until fusion of the gelled composition is complete. If desired, the inner face of the deposit can be flocked or provided with a fabric liner before the gelled composition of the deposit is fused, or the inner face of the deposit can be sprayed with a suitable lacquer after fusion of the deposit. However, if the boot is to be provided with a sponge-like liner, the liner may be formed in the following manner. After the mold has been reheated, as described above and shown in Fig. 7, mold 10 is filled with a heat-fusible sponge-forming composition to a depth at least corresponding to the upper edge of the boot being formed. The sponge-forming composition may be the same composition used heretofore in the process except that a blowing agent capable of liberating a gas when heated is included in the composition. As shown in Fig. 8, mold 10 preferably is in a toe-depending position during the initial stage of filling the mold with the heat-fusible sponge-forming composition to prevent entrapment of air in toe section 10a of the mold 10 when the mold is being filled. When toe section 10a has been filled with the sponge-forming composition, for example to level c as shown in Fig. 8, mold 10 is returned to an upright position, as shown in Fig. 9, and the filling of the mold with the sponge-forming composition is continued until the mold is filled to the proper level. The sponge-forming composition may be introduced into the mold in any convenient manner, such as through a nozzle 18, nozzle 18 being connected to a suitable storage container (not shown) for the sponge-forming composition.

Figure 11:
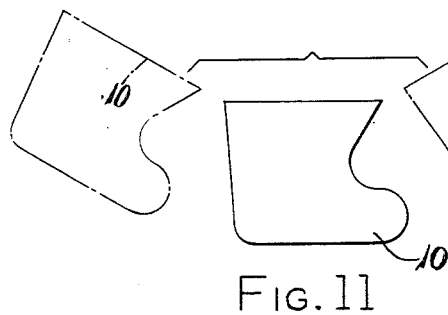
Fig. 11 shows schematically rotating or rocking the mold to distribute heat-fusible sponge-forming composition evenly over the bottom face of the mold.
Figure 10:
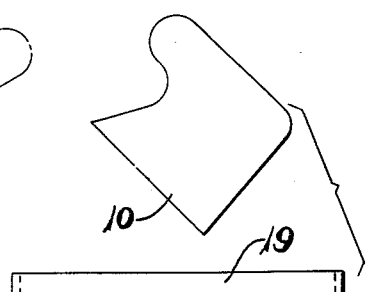
Fig. 10 shows schematically draining excess heat-fusible sponge-forming composition from the mold.

When the filling of mold 10 with sponge-forming composition has been completed, the mold is inverted and substantially all of the heat-fusible sponge-forming composition is allowed to drain from the mold into a suitable container 19, as shown in Fig. 10, the sponge-forming composition remaining in mold 10 after the draining operation being that which clings to the gelled deposit previously formed in the mold. After the excess sponge-forming composition has been drained from mold 10, the mold is returned to an upright position and is rocked or rotated, as shown in Fig. 11, to distribute the composition at the bottom of the mold cavity evenly over the bottom or sole portion of the previously formed gelled deposit.

Figure 12:
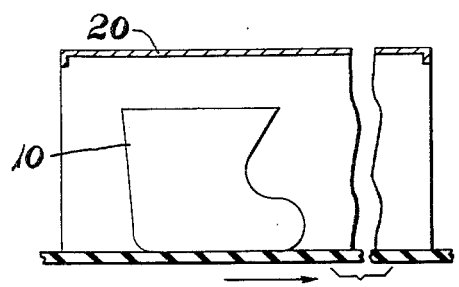
Fig. 12 shows schematically heating the mold to blow and to gel the layer of heat-fusible sponge-forming composition adhering to the previously gelled deposit of heat-fusible composition on the wall of the mold and to fuse the gelled heat-fusible material deposited on the mold wall.

Mold 10 then is heated, such as by advancing the mold through a hot air oven 20 as shown in Fig. 12, to cause decomposition of the blowing agent in the sponge-forming composition, thereby "blowing" the sponge-forming composition into a cellular structure, and to cause gelation of the blown deposit of heat-fusible composition. The gelled heat-fusible deposits formed on the wall of mold 10, as heretofore described, are fused by heating mold 10 to a temperature sufficient to fuse the heat-fusible compositions used to form the deposits. Fusion of the heat-fusible deposits on the wall of mold 10 may be effected as the mold is advanced through hot air oven 20. However, if it is desired to incorporate a flock or fabric lining in the boot, the flock or fabric is disposed over the inner face of the blown deposit before the gelled heat-fusible deposits formed on the wall of mold 10 are fused.

Figure 13:
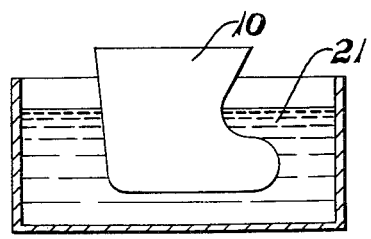
Fig. 13 shows schematically cooling the mold and fused deposits by advancing the mold through a cooling medium.
Figure 14:
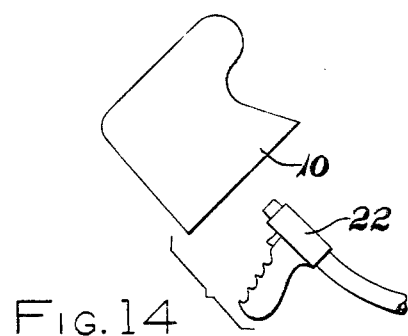
Fig. 14 shows schematically spraying the interior of the boot with lacquer while the boot is in the mold.

After the heat-fusible deposits adhering to the wall of the mold 10 have been fused, the mold is cooled to facilitate handling of the mold, such as by advancing mold 10 through a cooling medium for example a water bath 21 as shown in Fig. 13. If the boot being formed has not been provided with a flock or fabric lining, a suitable lacquer normally is applied to the inner surface of the blown deposit, such as by spraying the lacquer onto the inner surface of the sponge deposit with a suitable spraying device 22 as shown in Fig. 14.

The boot then is removed from old 10 and is provided with a closure device, if required.

It will be appreciated from the above description of the process of this invention that the boot has an extra thickness of material along the sole and along the side of the boot extending upwardly a desired height.

It is clear that many modifications and variations of this invention may be made without departing from the spirit and scope of the invention as defined in the appended claims.

We claim:

1. A method for making an article of footwear which comprises filling a hollow mold having a cavity corresponding in contour to the shape of the outer surface of said article of footwear with a liquid heat-fusible composition to a level which corresponds at least to the height of said article of footwear to be formed therewithin, removing from said mold said liquid heat-fusible composition in excess of that amount required to form a coating of said liquid heat-fusible composition on the interior sidewall faces of said mold and to fill the bottom of said cavity with a pool of said liquid heat-fusible composition to a level equal to the height to which it is desired to form an extra thick wall in said article of footwear, heating said mold to gel said coating of liquid heat-fusible composition clinging to the interior sidewall faces of said mold and to deposit on the wall of said mold in contact with said pool of heat-fusible composition a layer of heat-fusible composition of desired thickness through gelation of liquid heat-fusible composition in said pool of liquid heat-fusible composition at the bottom of said cavity adjacent said wall of said mold, removing from said mold the excess liquid heat-fusible composition remaining in said pool of heat-fusible composition at the bottom of said cavity, and heating said mold to fuse the gelled heat-fusible composition deposited on the wall of said mold.

2. A method for making an article of footwear which comprises filling a hollow mold having a cavity corresponding in contour to the shape of the outer surface of said article of footwear with a liquid heat-fusible composition to a level which corresponds at least to the height of said article of footwear to be formed therewithin by filling said mold initially in a toe-depending position until at least the toe section of the mold is filled with said liquid heat-fusible composition and then completing the filling of said mold with said liquid heat-fusible composition to the said level with said mold in an upright position, removing from said mold said liquid heat-fusible composition in excess of that amount required to form a coating of said liquid heat-fusible composition on the interior sidewall faces of said mold and to provide a pool of said liquid heat-fusible composition in the bottom of said cavity of a depth equal to the height to which it is desired to form an extra thick wall in said article of footwear, heating said mold to gel said coating of liquid heat-fusible composition clinging to the interior sidewall faces of said mold and to deposit on the wall of said mold in contact with said pool of heat-fusible composition a layer of heat-fusible composition of desired thickness through gelation of liquid heat-fusible composition in said pool of liquid heat-fusible composition at the bottom of said cavity adjacent said wall of said mold, removing from said mold the excess liquid heat-fusible composition remaining in said pool of heat-fusible composition at the bottom of said cavity, and heating said mold to fuse the gelled heat-fusible composition deposited on the wall of said mold.

3. A method for making an article of footwear which comprises filling a hollow mold having a cavity corresponding in contour to the shape of the outer surface of said article of footwear with a liquid heat-fusible composition to a level which corresponds at least to the height of said article of footwear to be formed therewithin, removing from said mold said liquid heat-fusible composition in excess of that amount required to form a coating of said liquid heat-fusible composition on the interior sidewall faces of said mold and to provide a pool of said liquid heat-fusible composition in the bottom of said cavity of a depth equal to the height to which it is desired to form an extra thick wall in said article of footwear by inverting said mold to a toe-depending position and allowing liquid heat-fusible composition to drain therefrom, heating the mold to reduce the viscosity of the liquid heat-fusible composition adjacent the wall of the mold to facilitate the draining of liquid heat-fusible composition from the mold while the mold is inverted, returning said mold to an upright position, heating said mold to gel said coating of liquid heat-fusible composition clinging to the interior sidewall faces of said mold and to deposit on the wall of said mold in contact with said pool of heat-fusible composition a layer of heat-fusible composition of desired thickness through gelation of liquid heat-fusible composition in said pool of liquid heat-fusible composition at the bottom of said cavity adjacent said wall of said mold, removing from said mold the excess liquid heat-fusible composition remaining in said pool of heat-fusible composition at the bottom of said cavity, and heating said mold to fuse the gelled heat-fusible composition deposited on the wall of said mold.

4. A method for making an article of footwear which comprises filling a hollow mold having a cavity corresponding in contour to the shape of the outer surface of said article of footwear with a liquid heat-fusible composition to a level which corresponds at least to the height of said article of footwear to be formed therewithin by filling said mold initially in a toe-depending position until at least the toe section of said mold is filled with said liquid heat-fusible composition and then completing the filling of said mold with said liquid heat-fusible composition to the said level with said mold in an upright position, removing from said mold said liquid heat-fusible composition in excess of that amount required to form a coating of said liquid heat-fusible composition on the interior sidewall faces of said mold and to provide a pool of said liquid heat-fusible composition in the bottom of said cavity of a depth equal to the height to which it is desired to form an extra thick wall in said article of footwear by inverting said mold to a toe-depending position and allowing liquid heat-fusible composition to drain therefrom, returning said mold to an upright position, heating said mold to gel said coating of liquid heat-fusible composition clinging to the interior sidewall faces of said mold and to deposit on the wall of said mold in contact with said pool of heat-fusible composition a layer of heat-fusible composition of desired thickness through gelation of liquid heat-fusible composition in said pool of liquid heat-fusible composition at the bottom of said cavity adjacent said wall of said mold, removing from said mold the excess liquid heat-fusible composition remaining in said pool of heat-fusible composition at the bottom of said cavity, and heating said mold to fuse the gelled heat-fusible composition deposited on the wall of said mold.

References Cited in the file of this patent

UNITED STATES PATENTS

| | | |
|---|---|---|
| 2,453,604 | Tenenbaum et al. | Nov. 9, 1948 |
| 2,588,571 | Porter | Mar. 11, 1952 |
| 2,617,208 | Marx et al. | Nov. 11, 1952 |
| 2,696,642 | Kohrn | Dec. 14, 1954 |
| 2,880,467 | Wibbins | Apr. 7, 1959 |

FOREIGN PATENTS

| | | |
|---|---|---|
| 500,298 | Great Britain | Feb. 7, 1939 |
| 725,100 | Great Britain | Aug. 24, 1953 |